April 19, 1960
B. D. McINTYRE ET AL
2,933,328
TRAILER SUSPENSION
Filed Sept. 15, 1958
2 Sheets-Sheet 1
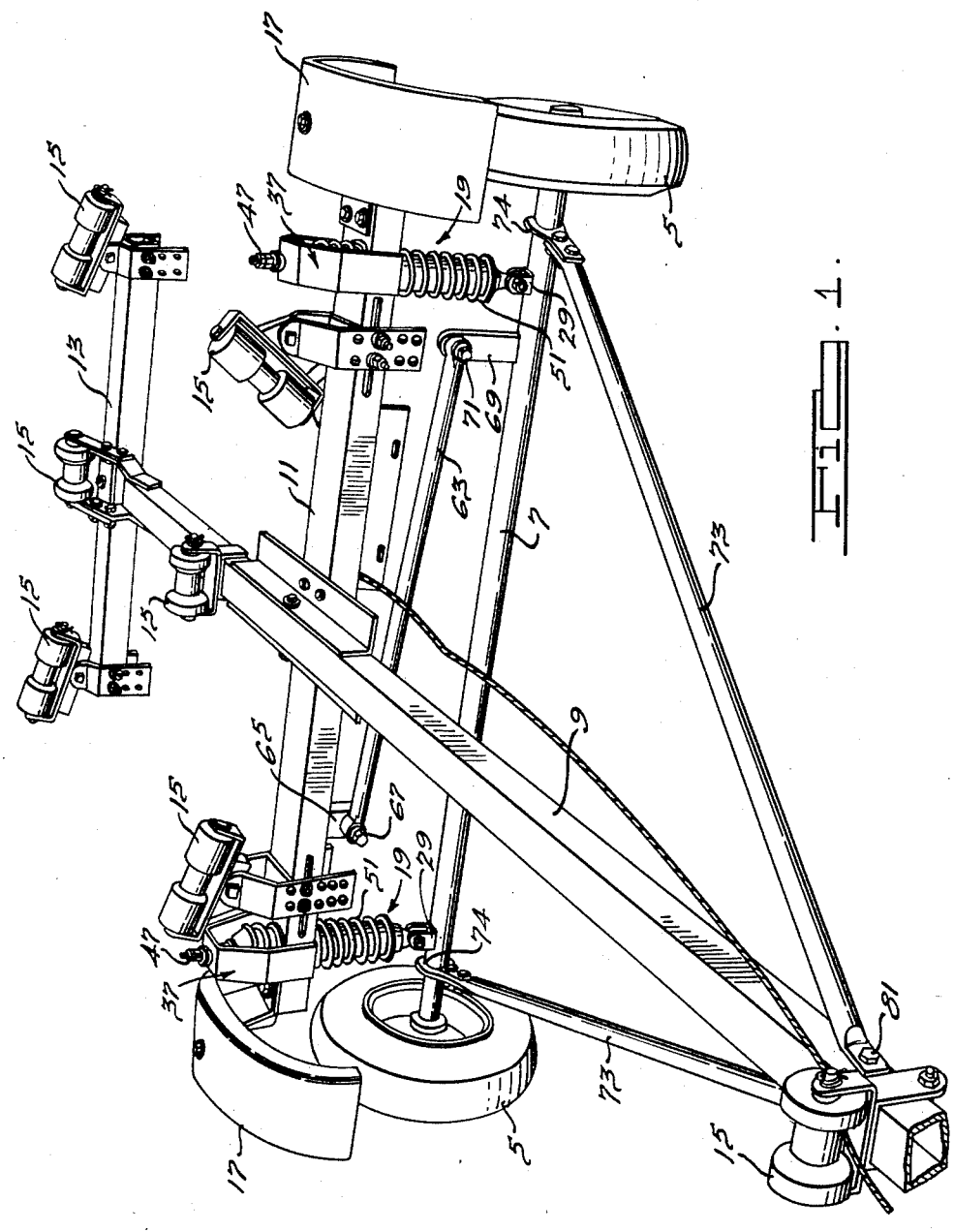
INVENTORS.
Brouwer D. McIntyre,
Charles J. Smith.
BY
Harness, Dickey & Pierce
ATTORNEYS.

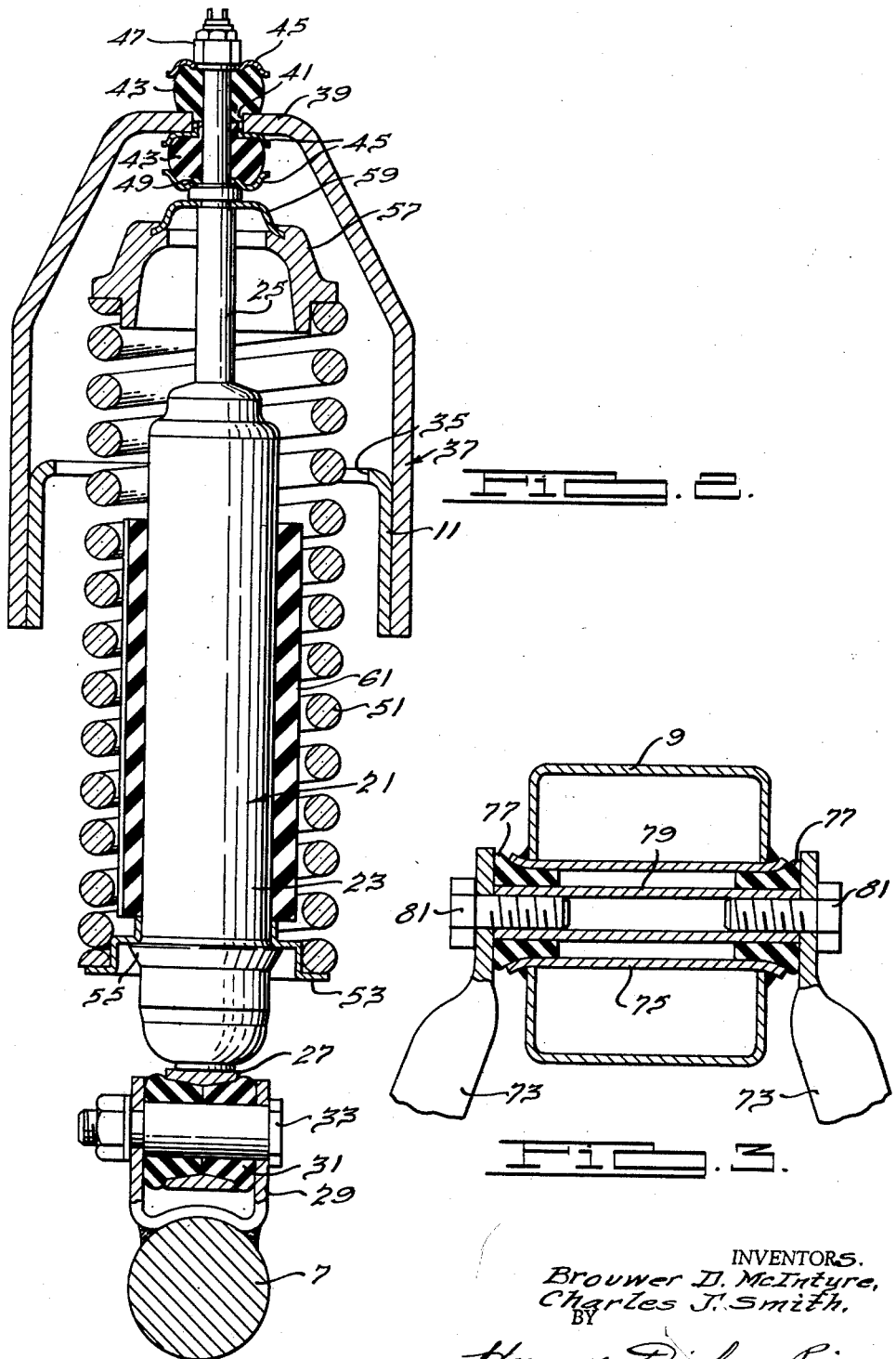

United States Patent Office 2,933,328
Patented Apr. 19, 1960

2,933,328

TRAILER SUSPENSION

Brouwer D. McIntyre and Charles J. Smith, Monroe, Mich., assignors to Monroe Auto Equipment Company, Monroe, Mich., a corporation of Michigan Application September 15, 1958, Serial No. 761,062

1 Claim. (Cl. 280—106.5)

This invention relates generally to trailers and more particularly to an improved trailer suspension.

While this invention is not specifically limited to any type of cargo carrying trailer, the suspension is illustrated as incorporated in a boat trailer construction. Boat trailers are being used in increasingly greater quantities to transport all types of boats over various types of road and ground surfaces. Present-day boats are very expensive and are often transported over extremely rough ground terrain so that it is important that transporting trailers have good suspension or riding characteristics. Boat trailers are, to a large extent, towed behind conventional automobiles and, in many instances, are transported over substantial distances. It is, therefore, important that the trailer be of the type which will "pull" well and which will properly "track." That is, the trailer must not sway to any substantial extent and must properly follow the towing vehicle along the various paths it may travel.

While many types of boat trailers have been heretofore designed and built, it has been found that such boat trailers often do not have good riding characteristics and if such trailers incorporate springs, the springs are not dampened so that they tend to pitch the trailer and boat, which is undesirable, particularly if the boat is carrying fuel or fragile materials. Furthermore, it has been noted that many trailers excessively sway while being towed, and such trailers quite often do not properly follow the vehicle or "track" as they should.

It is, therefore, an object of this invention to provide an improved boat trailer and suspension in which improved riding characteristics, as well as improved pulling and tracking characteristics are obtained.

It is a still further object of this invention to provide a trailer of the aforementioned type in which the frame portion of the trailer is suspended on the wheels and axle through improved coil spring and shock absorber suspension devices and in which such suspension devices are mounted and arranged so as to have the necessary travel to permit them to improve the riding characteristics of the trailer.

It is a still further object of this invention to provide a trailer of the aforementioned type in which a relatively simple and improved means are provided for preventing sway of the trailer sprung assembly relative to the unsprung assembly and to provide improved means for retaining the ground engaging wheels in proper alignment so that the trailer will properly "track" at all times.

It is a still further object of this invention to provide an improved trailer of the aforementioned type in which the various suspension elements are connected with the trailer sprung and unsprung portions through rubber-type connections so as to provide a trailer having longer life, improved riding characteristics and quiet operation.

It is a still further object of this invention to provide a trailer of the aforementioned type which is relatively inexpensive to manufacture and which is exceptionally durable in use and functionally efficient.

These and other objects of this invention will become apparent from the following description taken in conjunction with the accompanying drawings in which:

Figure 1 is a fragmentary, perspective view of a portion of a boat trailer of this invention;

Fig. 2 is an enlarged view, partially in section and partially in elevation, showing the manner in which one of the spring and shock absorber suspension devices is connected between the sprung and unsprung portions of the trailer illustrated in Fig. 1; and Fig. 3 is an enlarged, fragmentary, sectional view of the structure illustrated in Fig. 1, showing the manner in which the radius rods are connected at their front ends with the longitudinal frame member of the trailer.

Referring now to the drawings, it will be seen that the illustrated trailer includes laterally spaced, ground engaging wheels 5 journaled on axle means 7 in a conventional manner. The wheels 5 and axle means 7 comprise the unsprung portion of the vehicle on which the trailer frame or sprung portion is mounted, as will be hereinafter described.

The trailer frame includes a longitudinal frame member 9 and a main lateral frame member 11 which is connected with the longitudinal frame member 9 by any suitable means so that a rigid connection is provided. An auxiliary lateral frame member 13 is connected to the rear of the longitudinal frame member 9 and supported on the various frame members are a plurality of boat supports or rollers 15. The boat support or roller members 15 are adjustably supported on the frame members in a conventional manner and are adapted to engage and support a boat in the desired location on the trailer. Wheel fenders 17 are mounted on the lateral frame member 11 above the wheels 5 for the usual purpose.

In order to properly support the trailer frame on the unsprung portion of the trailer, a suspension device, indicated generally at 19, is provided adjacent each of the wheels 5. Each of the suspension devices 19 includes a tubular, direct-acting, hydraulic shock absorber 21 which has relatively movable telescopic portions. One of such portions includes a cylinder and reservoir assembly 23 while the other portion includes a valved piston and piston rod assembly 25, in a conventional manner. A loop-like fitting 27 is connected to the lower end of the cylinder and reservoir assembly 23 and in turn is connected to the axle means 7 by means of a U-shaped bracket 29, rubber grommets 31 and a bolt and nut 33. The upper end of each shock absorber extends through an aperture 35 in the lateral frame member 11. An inverted U-shaped bracket 37 is welded or otherwise secured to the lateral frame member 11 and has an upper wall 39 disposed above the lateral frame member and above the opening 35 therein. The upper wall of the bracket 37 is provided with a central aperture 41 through which the upper end of the piston rod 25 extends. The piston rod 25 is flexibly connected with the bracket 37 through rubber grommets 43 which are disposed on opposite sides of the bracket upper wall 39 and partially confined in sheet metal stampings 45.

A nut 47 is threaded on the upper threaded end of the piston rod so as to compress the rubber grommets 43 against the upper bracket wall 39 and between the piston rod nut 47 and a piston rod shoulder 49 spaced below the underside of the bracket wall 39. Thus, the shock absorbers are flexibly connected with the trailer sprung and unsprung portions and are pivotally connected to the axle means for rotation about horizontal axes extending fore and aft of the trailer.

In order to provide a compact suspension device, a coil spring 51 surrounds each shock absorber 21 and is supported at its lower end by means of a support member 53 which is sleeved over and supported on the shock absorber cylinder and reservoir assembly 23 by a flanged shoulder 55. The upper end of the spring 51 engages a split collar 57 which is sleeved over the piston rod 25 and retained thereon by means of a fitting 59 which engages the underside of the piston rod flange shoulder 59. A non-metallic spacer sleeve 61 is disposed between the coil spring 51 and the shock absorber so as to prevent the spring from buckling and to retain the spring in a generally concentric relationship relative to the shock absorber. The spring 51, likewise, extends through the opening 35 in the trailer lateral frame member 11 so that the upper end thereof is disposed within the inverted U-shaped bracket 37. By extending the shock absorber and spring through and above the lateral frame member 11, sufficient space is provided between the trailer sprung and unsprung assemblies to permit sufficient vertical movement or travel of the shock absorber and coil spring to provide a satisfactory and efficient trailer suspension.

It will thus be appreciated that the sprung portion of the trailer is properly suspended adjacent each ground engaging wheel so that good riding characteristics can be provided to permit a boat to be easily carried over even rough terrain. The shock absorber is, of course, valved to provide the proper dampening for the spring 51 and the spring rate may vary in accordance with the weight of the boat to be carried.

In order to prevent lateral sway of the trailer sprung portion relative to the unsprung portion, which would be very undesirable when towing a trailer, a lateral stabilizing strut 63 is provided, one end of which is connected to the lateral frame member 11 adjacent one ground engaging wheel 5 and the opposite end of which is connected to the axle means 7 adjacent the opposite ground engaging wheel 5. The lateral strut 63 is pivotally connected to the lateral frame member 11 through a bracket 65, a bolt and nut 67 and suitable rubber grommets, now shown. The opposite end of the lateral strut 63 is connected to the axle means 7 through an upstanding bracket 69, a bolt and nut 71 and suitable rubber grommets, not shown. In view of the fact that the lateral frame member 11 is disposed above the axle means 7, the strut 63 extends laterally of the vehicle and is pivotally connected to both the sprung and unsprung trailer portions for movement about horizontal axes extending fore and aft of the trailer. When a boat is positioned on the trailer frame, the lateral strut 63 will extend in a generally horizontal plane, but when the trailer is empty as illustrated, the strut extends at a slight angle downwardly from left to right as illustrated in Fig. 1.

In order to insure proper tracking of the trailer so that it will properly follow a towing vehicle, radius rods 73 are provided. Each of the radius rods is connected at its rearmost end to the axle means 7 by straps 74 which are welded to the axle and bolted to the rear of the radius rods. The rods 73 converge forwardly so that the forward ends thereof are disposed adjacent opposite sides of the longitudinal frame member 9 substantially forwardly of the axle 7. The radius rods are pivotally connected with the longitudinal frame member 9 as can be best seen in Fig. 3. As shown therein, a metal sleeve 75 extends laterally through and is welded to the longitudinal frame member 9. Rubber grommets 77 are disposed in opposite ends of the sleeve 75 and are sleeved over an inner metal sleeve member 79 which is internally threaded adjacent its opposite ends so as to receive cap screws 81 which pivotally connect the radius rods 73 with the longitudinal frame member 9 through the rubber members. It will be seen that the axis of pivotal connection of the radius rods to the frame 9 is a horizontal axis extending laterally of the trailer. The radius rods thus insure proper alignment of the ground engaging wheels at all times so that the vehicle will properly "track" when it is towed.

It will thus be seen that the trailer of this invention incorporates an improved suspension system which will provide a soft cushioned ride for a boat or cargo carried thereby and which will "pull" and "track" in a desired manner without sway because of the arrangement of the parts previously described.

What is claimed is:

A trailer including a pair of laterally spaced, ground engaging wheels, axle means extending between and connected with said wheels, frame means including a laterally extending member disposed above said axle means and a longitudinal member extending at least forwardly of said lateral frame member, a suspension device adjacent each of said wheels, each of said suspension devices including a hydraulic shock absorber having relatively movable telescopic parts, a coil spring surrounding said shock absorber and means supporting the opposite ends of said spring on said relatively movable shock absorber parts so that movement of said shock absorber parts toward each other will cause compression of said spring and movement of said shock absorber parts away from each other will permit extension of said spring, whereby said shock absorber will dampen said spring, resilient means pivotally connecting the lower ends of said shock absorber to said axle means, said lateral frame member having openings therein through which the upper ends of both said springs and said shock absorbers of each of said suspension devices extend, bracket means connected with said lateral frame member and extending above said lateral frame member, resilient means connecting the upper ends of said shock absorbers with said bracket means above said lateral frame member, a rigid strut extending laterally of said trailer and disposed between said lateral frame member and said axle means, means pivotally and resiliently connecting one end of said strut to said lateral frame member adjacent one of said wheels, means pivotally and resiliently connecting the opposite end of said strut to said axle means adjacent the other of said wheels whereby said strut will substantially retain said trailer frame and axle means in a predetermined lateral relationship, a rigid rod member rigidly connected to said axle means adjacent each of said wheels, said rod members converging forwardly of said axle means so that the leading ends thereof are disposed adjacent opposite sides of said longitudinal frame member forwardly of said axle means, and means pivotally and resiliently connecting the forward ends of said rods to said longitudinal frame member whereby said rods will substantially retain said axle means and wheels in proper alignment.

References Cited in the file of this patent

UNITED STATES PATENTS

| | | |
|---|---|---|
| 2,322,890 | Slack | June 29, 1943 |
| 2,700,480 | Triplett | Jan. 25, 1955 |
| 2,703,708 | Wagner | Mar. 8, 1955 |
| 2,779,603 | McRae | Jan. 29, 1957 |
| 2,823,927 | Goby | Feb. 18, 1958 |